(12) United States Patent
Yoon

(10) Patent No.: US 7,423,707 B2
(45) Date of Patent: Sep. 9, 2008

(54) LIQUID CRYSTAL DISPLAY DEVICE AND FABRICATING METHOD FOR FORMING POLARIZER BY DEPOSITING, DRYING AND CURING LYOTROPIC LIQUID CRYSTAL ON COLOR FILTER PATTERN

(75) Inventor: Sunghoe Yoon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 549 days.

(21) Appl. No.: 11/023,611

(22) Filed: Dec. 29, 2004

(65) Prior Publication Data
US 2005/0140894 A1  Jun. 30, 2005

(30) Foreign Application Priority Data
Dec. 31, 2003 (KR) ............... 10-2003-0101675

(51) Int. Cl.
*G02F 1/1335* (2006.01)
(52) U.S. Cl. ..................... 349/96; 349/106
(58) Field of Classification Search ............ 349/96, 349/141, 106
See application file for complete search history.

(56) References Cited

U.S. PATENT DOCUMENTS

| | | | |
|---|---|---|---|
| 6,417,899 B1 * | 7/2002 | Jones et al. | 349/96 |
| 6,583,841 B2 * | 6/2003 | Youn et al. | 349/141 |
| 7,023,509 B2 * | 4/2006 | Iijima et al. | 349/113 |
| 2002/0105608 A1 * | 8/2002 | Lazarev | 349/96 |
| 2002/0131172 A1 * | 9/2002 | Hayashi et al. | 359/492 |
| 2004/0179165 A1 * | 9/2004 | Kinoshita et al. | 349/158 |

\* cited by examiner

*Primary Examiner*—David C. Nelms
*Assistant Examiner*—John Heyman
(74) *Attorney, Agent, or Firm*—Morgan, Lewis & Bockius LLP

(57) ABSTRACT

A liquid crystal display (LCD) device includes: first and second substrates, inner surfaces of the first and second substrates facing each other; gate and data lines crossing each other to define a pixel region on the inner surface of the first substrate; a thin film transistor at the crossing of the gate and data lines; a pixel electrode connected with the thin film transistor; a color filter pattern on the inner surface of the second substrate; a first polarizing layer between the first and second substrates and adjacent to the color filter pattern; and a liquid crystal material between the first and second substrates.

20 Claims, 8 Drawing Sheets

LIQUID CRYSTAL DISPLAY DEVICE AND FABRICATING METHOD FOR FORMING POLARIZER BY DEPOSITING, DRYING AND CURING LYOTROPIC LIQUID CRYSTAL ON COLOR FILTER PATTERN

The present invention claims the benefit of Korean Patent Application No. 2003-0101675 filed in Korea on Dec. 31, 2003, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device and fabricating method thereof.

2. Discussion of the Related Art

Until recently, display devices have typically used cathode-ray tubes (CRTs). Presently, many efforts are being made to study and develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into direction of the induced electric field, thereby changing the light transmissivity of the LCD device. Thus, the LCD device displays images by varying the intensity of the induced electric field.

FIG. 1 is a perspective view of a liquid crystal panel of an LCD device according to the related art. As shown in FIG. 1, a liquid crystal panel 1 includes an upper substrate 10, a lower substrate 20 and a liquid crystal layer 40. The upper substrate 10 is referred to as a color filter substrate that includes a color filter pattern 14, a black matrix 12 between the color filter patterns 14, a common electrode 18 on both the color filter pattern 14 and the black matrix 12. The lower substrate 20 is referred to as an array substrate that includes a data line 24 and a gate line 22 that cross each other and define a pixel region P. A pixel electrode 36 and a thin film transistor Tr as a switching element are positioned in each pixel region P. Thin film transistors Tr, which are disposed adjacent to where the data lines 24 and the gate lines 22 cross, are disposed in a matrix form on the lower substrate 20.

FIG. 2 is a cross-sectional view of a liquid crystal panel according to the related art. As shown in FIG. 2, a liquid crystal panel 40 includes lower and upper polarizing films 50 and 52 disposed on the outer surfaces of the lower and upper substrates 20 and 10, respectively. Although not shown in FIG. 2, a backlight unit including a lamp and at least one optical sheet are disposed below the lower polarizing film 50.

FIGS. 3A to 3D are cross-sectional views of the fabricating method of a color filter substrate according to the related art. As shown in FIG. 3A, a metal or a resin is deposited on a substrate 10 and patterned to form a black matrix 12. The black matrix 12 prevents light leakage and shields the channel portion of a thin film transistor from incident light.

As shown in FIG. 3B, a red color resist is deposited over the substrate 10 having the black matrix 12 by a coating process, such as spin coating, to form a red resist layer 13. Then, the red resist layer 13 is exposed to light through a mask 15 having a light-transparent portion and a light-blocking portion. The red color resist is a negative type resist.

As shown in FIG. 3C, since the red color resist is a negative type resist, the light-exposed portion of the red resist layer 13 (in FIG. 3B) remains while the light-blocked portion of the red resist layer 13 (in FIG. 3B) is removed so that a red color filter pattern 14a is formed. Then, the red color filter pattern 14a is cured.

In FIG. 3D, green and blue color filter patterns 14b and 14c are similarly formed. Then, a transparent conductive material is deposited over the color filter patterns 14 to form a common electrode 18. The transparent conductive material can be indium-tin-oxide (ITO) or indium-zinc-oxide (IZO). An over-coat layer 16 can be formed between the common electrode 18 and the color filter patterns 14. The over-coat layer 16 planarizes the surface of the color filter patterns 14 on the substrate 10.

The color filter substrate fabricated through the above-mentioned processes is attached to an array substrate so that the inner surfaces of the substrates face each other. Then, a liquid crystal material is injected between the two substrates so that a liquid crystal panel is formed. Subsequently, upper and lower polarizing films are attached on outer surfaces of the liquid crystal panel, respectively.

FIG. 4 is a cross-sectional view of a color filter substrate, on which a polarizing film is attached, according to the related art. As shown in FIG. 4, a polarizing film 52 is attached on an outer surface of a color filter substrate 11 having a black matrix 12, red color filter pattern 14a, green color filter pattern 14b, blue color filter pattern 14c and a common electrode 18. Since the polarizing film 52 is attached on an outer surface of the color filter substrate 11, undesired light coming from the color filter patterns 14 is not blocked by the polarizing film 52. In other words, light going through the color filter patterns 14 is scattered by pigments dispersed in the color filter patterns 14 so that the scattered light leaks through the polarizing film 52. Therefore, polarizing efficiency of the LCD device is reduced.

Because the polarizing film 52 has a thickness of more than 200 micrometers (um), the polarizing film 52 causes the LCD device to have a thicker profile, which is contrary to the desired characteristic of the thin profile. Additionally, since the polarizing film 52 is formed by a film-stretching method, the polarizing film 52 is weak to heat and moisture. Thus, the performance of the liquid crystal panel can be adversely affected by heat and moisture. Further, the polarizing film 52 makes the liquid crystal panel inflexible because it includes a hard-type base film supporting a polarizing layer and an adhesive layer.

SUMMARY OF THE INVENTION

Accordingly, the present invention is directed to a liquid crystal display (LCD) device and a fabricating method thereof that substantially obviate one or more of problems due to limitations and disadvantages of the related art.

An object of the present invention is to provide a liquid crystal display (LCD) device and a fabricating method thereof that can increase polarizing efficiency of a liquid crystal display panel.

Another object of the present invention is to provide a liquid crystal display (LCD) device and a fabricating method thereof that can increase flexibility of a liquid crystal display panel.

Another object of the present invention is to provide a liquid crystal display (LCD) device and a fabricating method thereof that can reduce the profile of a liquid crystal display panel.

Another object of the present invention is to provide a liquid crystal display (LCD) device and a fabricating method thereof that makes a liquid crystal display panel more resistant to deformation by heat and moisture.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) device includes: first and second substrates, inner surfaces of the first and second substrates facing each other; gate and data lines crossing each other to define a pixel region on the inner surface of the first substrate; a thin film transistor at the crossing of the gate and data lines; a pixel electrode connected with the thin film transistor; a color filter pattern on the inner surface of the second substrate; a first polarizing layer between the first and second substrates and adjacent to the color filter pattern; and a liquid crystal material between the first and second substrates.

In another aspect, a fabricating method of a liquid crystal display (LCD) device includes: forming gate and data lines crossing each other to define a pixel region; forming a thin film transistor adjacent to where the gate and data lines cross; forming a pixel electrode connected with the thin film transistor on the inner surface of a first substrate; forming a color filter pattern on the inner surface of the second substrate, wherein the inner surfaces of the first and second substrates face each other; forming a first polarizing layer between the first and second substrates and adjacent to the color filter pattern; and injecting a liquid crystal material between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 1:
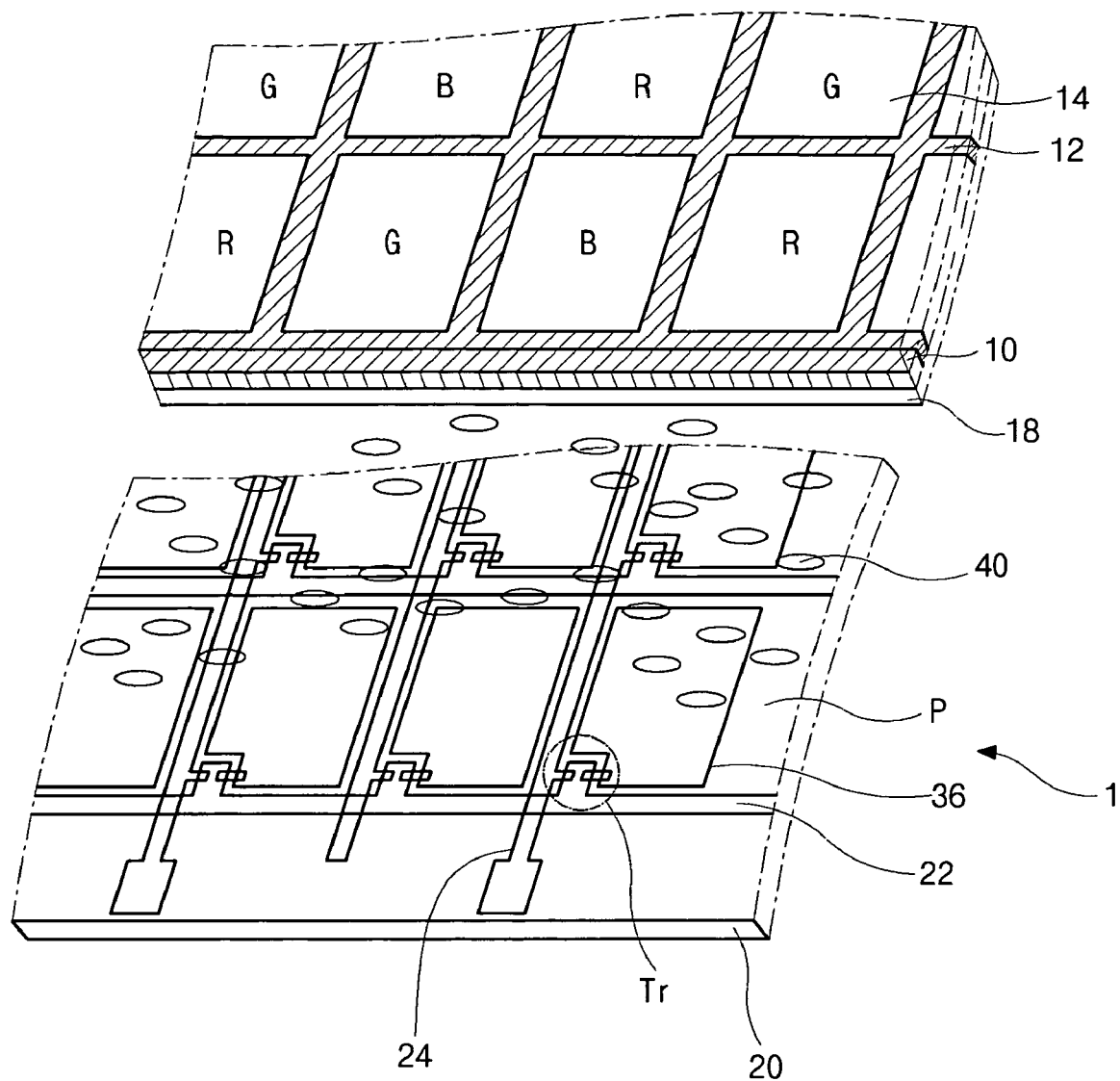
FIG. 1 is a perspective view of a liquid crystal panel of an LCD device according to the related art.
Figure 2:
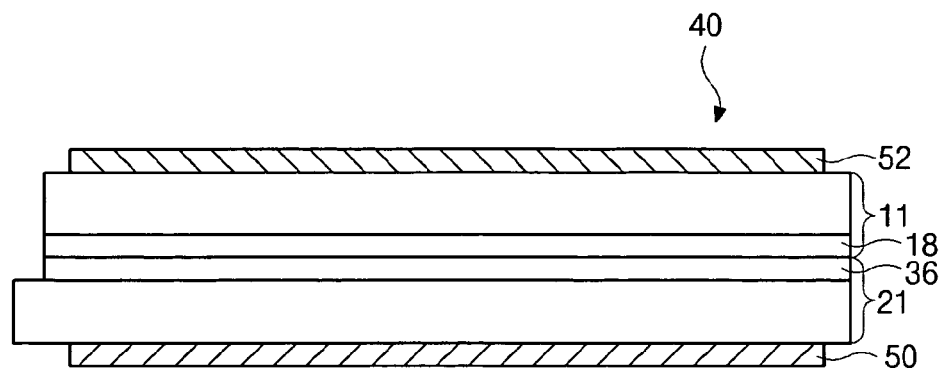
FIG. 2 is a cross-sectional view of a liquid crystal panel according to the related art.
Figure 3A:
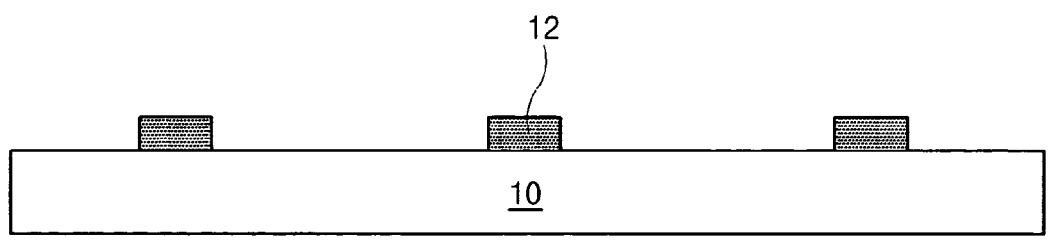
FIGS. 3A to 3D are cross-sectional views of fabricating method of a color filter substrate according to the related art.
Figure 3B:
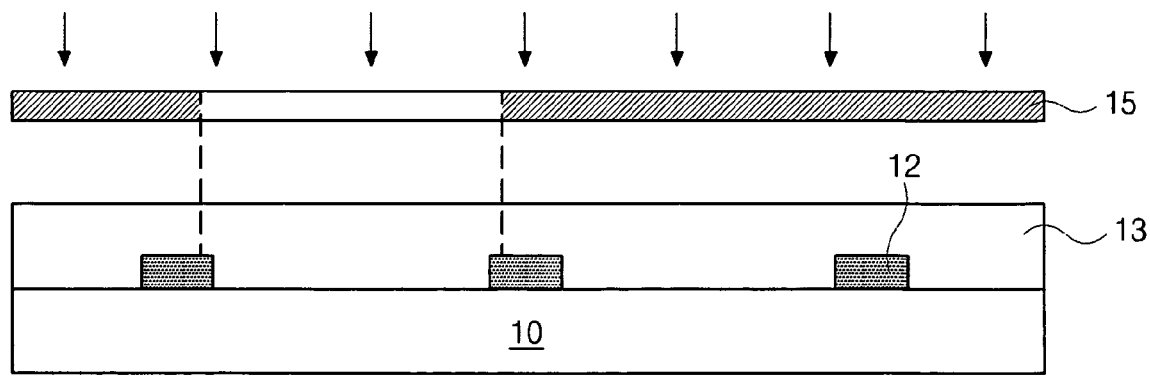
Figure 3C:
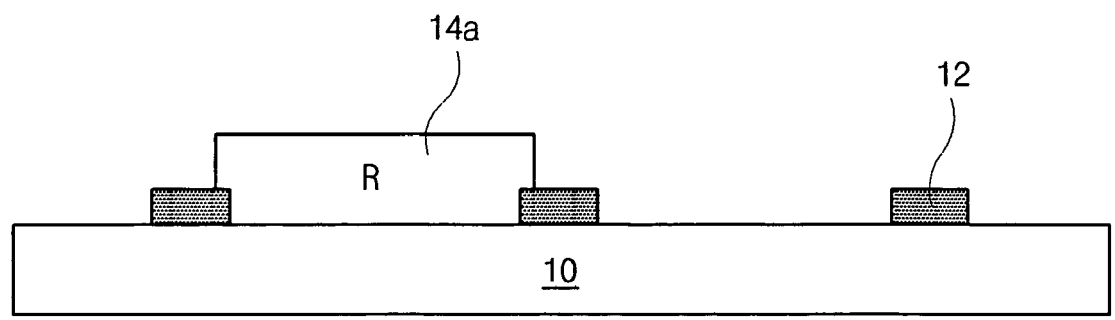
Figure 3D:
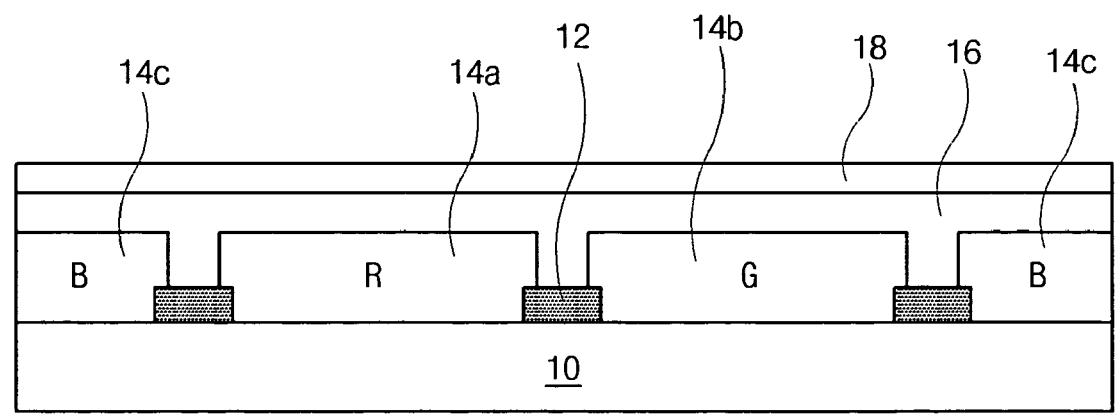
Figure 4:
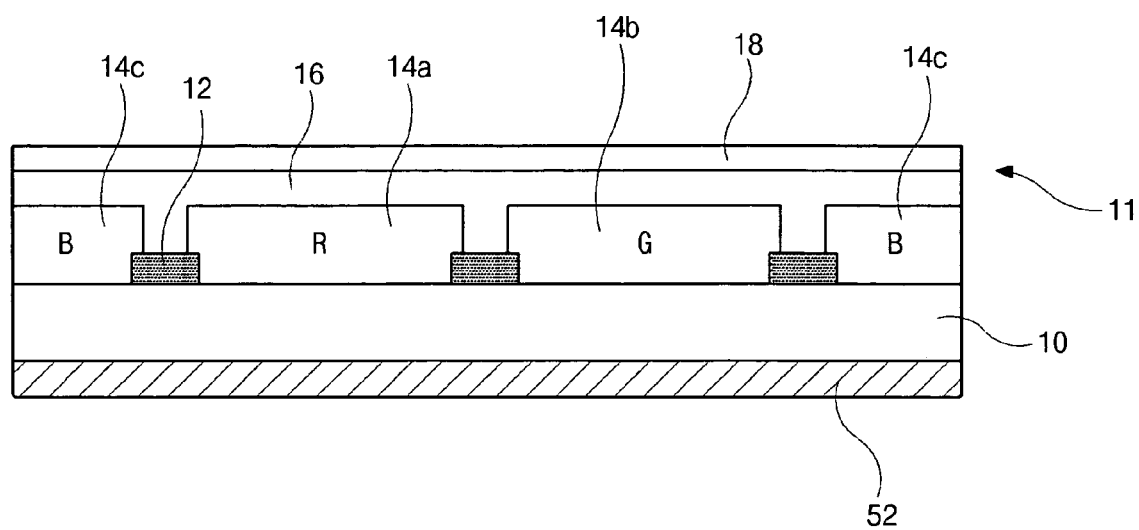
FIG. 4 is a cross-sectional view of a color filter substrate, on which a polarizing film is attached, according to the related art.
Figure 5:
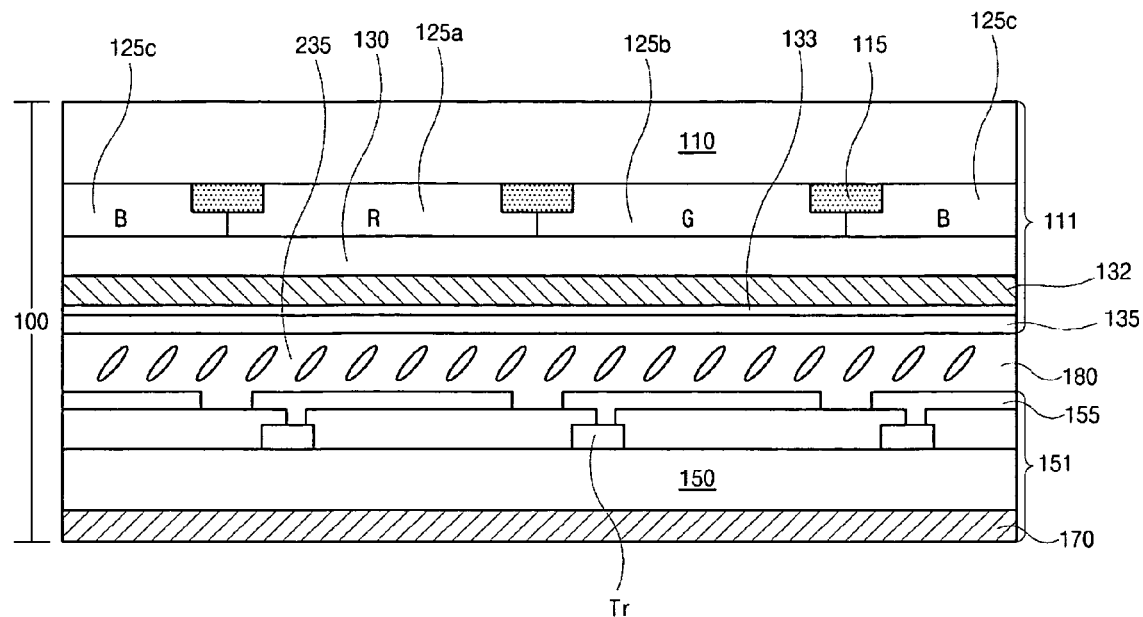
FIG. 5 is a cross-sectional view of a liquid crystal panel according to a first embodiment of the present invention.

FIG. 5 is a cross-sectional view of a liquid crystal panel according to a first embodiment of the present invention. As shown in FIG. 5, a liquid crystal panel 100 includes an upper substrate 111 as a color filter substrate, a lower substrate 151 as an array substrate, and a liquid crystal material 180 interposed between the upper and lower substrates 111 and 151. Inner surfaces of the upper substrate 111 and the lower substrate 151 face each other. A polarizing film 170 is attached on the outer surface of the lower substrate 151.

The lower substrate 151 includes a first substrate 150. A thin film transistor Tr is on the inner surface of the first substrate 150. A pixel electrode 155 is connected with the thin film transistor Tr. Although not shown in FIG. 5, the lower substrate 151 also includes a gate line and a data line crossing each other. The thin film transistor Tr is disposed adjacent to where the gate line and the data line cross. The thin film transistor Tr includes a gate electrode connected with the gate line, a source electrode connected with the data line, a drain electrode spaced apart from the source electrode and connected with the pixel electrode 155, and a semiconductor pattern.

The upper substrate 111 includes a second substrate 110, a black matrix 115 on the inner surface of the second substrate 110 with a red color filter pattern 125a, a green color filter pattern 125b and a blue color filter pattern 125c exposed through the black matrix 115, an over-coat layer 130 on the color filter patterns 125, a polarizing layer 132 on the overcoat layer 130, a protecting layer 133 on the polarizing layer 132, and a common electrode 135 on the protecting layer 133. The black matrix 115 can correspond to the thin film transistor Tr, the data line and the gate line on the lower substrate 151. Although not shown in FIG. 5, to align the liquid crystal material, upper and lower alignment layers are disposed on the common electrode 135 and the pixel electrode 155, respectively.

As shown in the liquid crystal panel 100 of FIG. 5, the polarizing film 170 is disposed on the outer surface of the liquid crystal panel 100, and the polarizing layer 132 is not disposed on an outer surface but rather within the liquid crystal panel 100, such as on the inner surface of the color filter substrate 111. A transmission axis of the polarizing layer 132 may be near perpendicular to a transmission axis of the polarizing film 170. A protecting layer 133 prevents penetration of a moisture into the polarizing layer 132.

Figure 6A:
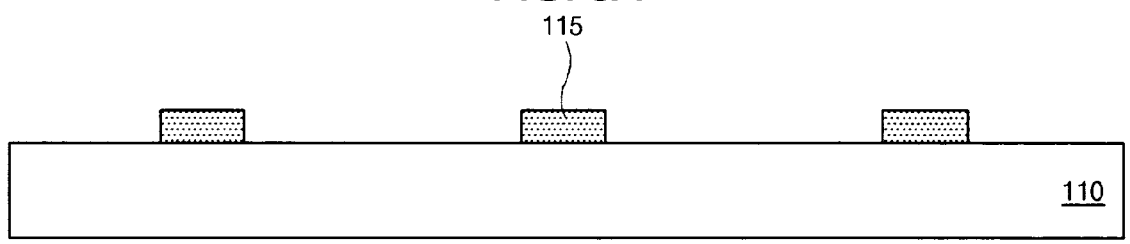
FIGS. 6A to 6F are cross-sectional views of a fabricating method of a color filter substrate according to the first embodiment of the present invention.

FIGS. 6A to 6F are cross-sectional views of a fabricating method of a color filter substrate according to the first embodiment of the present invention. As shown in FIG. 6A, a metal or a resin is deposited on a substrate 110, and patterned through photolithography to form a black matrix 115. The black matrix 115 corresponds to a periphery portion of a display region to display images. The black matrix 115 also corresponds to a gate line, a data line and a thin film transistor so as to cover a periphery portion of a pixel. Accordingly, the black matrix 115 prevents light-leakage and shields a channel portion of the thin film transistor Tr from incident light.

Figure 6B:
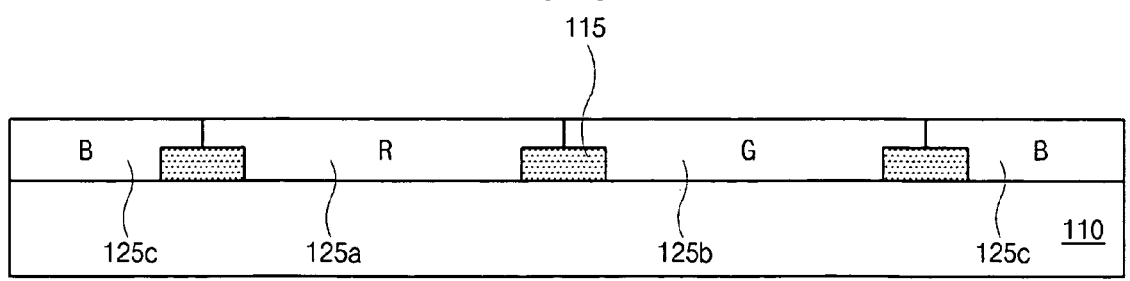

As shown in FIG. 6B, a red color resist is deposited over the entire substrate 110 having the black matrix 115 by a coating process, such as spin coating, to form a red resist layer. Then, the red resist layer is exposed with light through a mask having a light-transparent portion and a light-blocking portion. The red color resist may be a negative type resist. When the red color resist is a negative type resist, the light-exposed portion of the red resist layer remains and the light-blocked portion of the red resist layer is removed. Thus, a red color filter pattern 125a is formed on the substrate 110 and the black matrix 115. Then, the red color filter pattern 125a may be cured. Green and blue color filter patterns 125b and 125c are formed by similar methods.

Figure 6C:
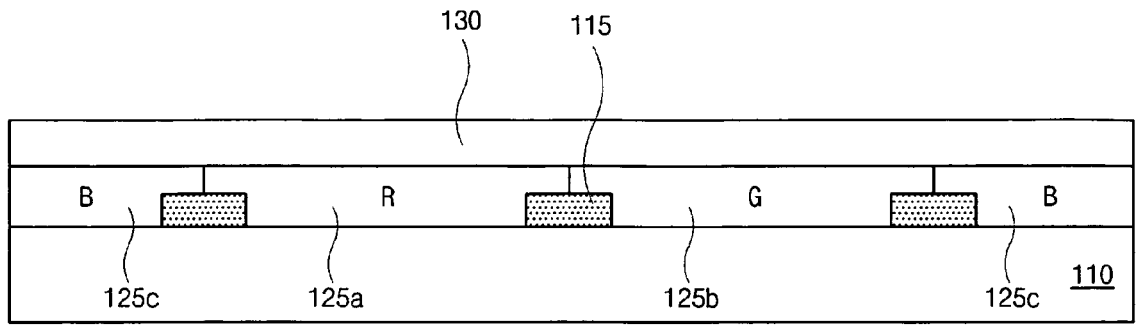

In FIG. 6C, an over-coat layer 130 is formed on the color filter patterns 125. The over-coat layer 130 is made of a transparent thermal-curing or optical-curing material. The transparent thermal-curing or optical-curing material can be an organic material, such as photo-acrylic, epoxy and organic-silicate, inorganic material, or hybrid-type (organic-inorganic) material. The over-coat layer 130 planarizes the surface of the color filter patterns 125 on the substrate 110.

Figure 6D:
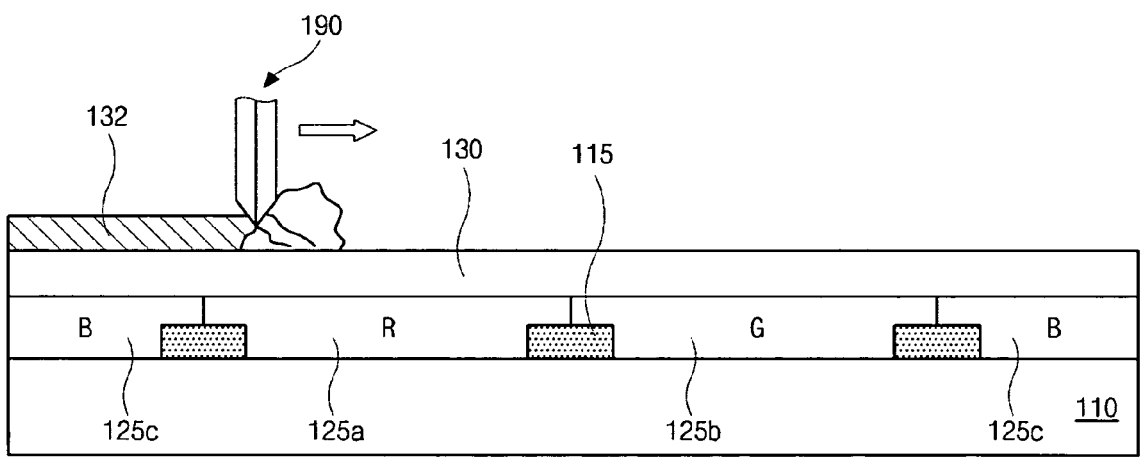

In FIG. 6D, a lyotropic liquid crystal 132 is deposited on the over-coat layer 130 and applied with shear force using a bar coating device or a slit coating device. The bar coating method is shown in FIG. 6D. In the bar coating method, a bar 190 applies pressure to the lyotropic liquid crystal 132 along a predetermined direction (arrow direction in FIG. 6D) to apply shear force to the lyotropic liquid crystal 132. Accordingly, a polarizing layer 132, in which the lyotropic liquid crystal molecules are arranged in a predetermined direction, is formed.

To apply shear force to the lyotropic liquid crystal 132, the bar 190 is contacted the lyotropic liquid crystal 132 and then the bar 190 is moved in the predetermined direction, which is near perpendicular to a transmission axis of the polarizing film 170 shown in FIG. 5. Alternatively, a stage, on which the substrate 110 is disposed, may move opposite to the predetermined direction while the bar 190 is in contact with the lyotropic liquid crystal 132. Accordingly, shear force arranges the lyotropic liquid crystal molecules in a selected direction. Therefore, the polarizing layer 132 having a transmission axis in a predetermined direction is formed.

Although the bar coating method is shown in FIG. 6D, a slit coating method can be used to achieve results somewhat similar to the bar coating process. In the slit coating method, when the lyotropic liquid crystal comes out through the slit, shear force is applied to the lyotropic liquid crystal as it comes out of the slit, thereby arranging the lyotropic liquid crystal molecules in the predetermined direction. Accordingly, the polarizing layer having a transmission axis in the predetermined direction is formed.

The polarizing layer 132 shown in FIG. 6D can have a thickness of about 5 micrometers~20 micrometers. The lyotropic liquid crystal can include amine and carboxylic acid having a plate structure. Alternatively, one of the amine and carboxylic acid can be substituted. Accordingly, the lyotropic liquid crystal has an aggregate having thin and long bars in an aqueous solution. A phase of the lyotropic liquid crystal does not vary depending upon temperature but rather depends upon the density of the solution. The lyotropic liquid crystal molecule has a hydrophilic substituent, such as sulfuric acid, on its surface for stability.

Figure 6E:
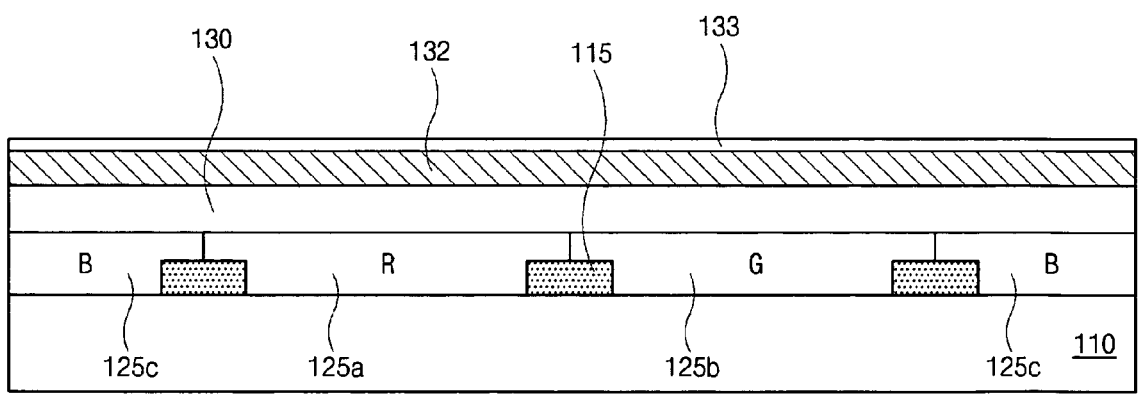

In FIG. 6E, the substrate 110 having the polarizing layer 132 is allowed to sit at a temperature of about 30 degrees Celsius~90 degrees Celsius so that the lyotropic liquid crystal 132 is dried. Then, the substrate 110 is put in a baking device, such as an oven having a chamber, and subjected to a temperature of about 150 degrees Celsius~250 degrees Celsius for about 10 minutes~60 minutes so that the polarizing layer 132 is cured. Since moisture in the polarizing layer 132 is removed during the drying and curing processes, the resultant polarizing layer 132 has a thickness of about 0.3 micrometers~1.5 micrometers.

Figure 6F:
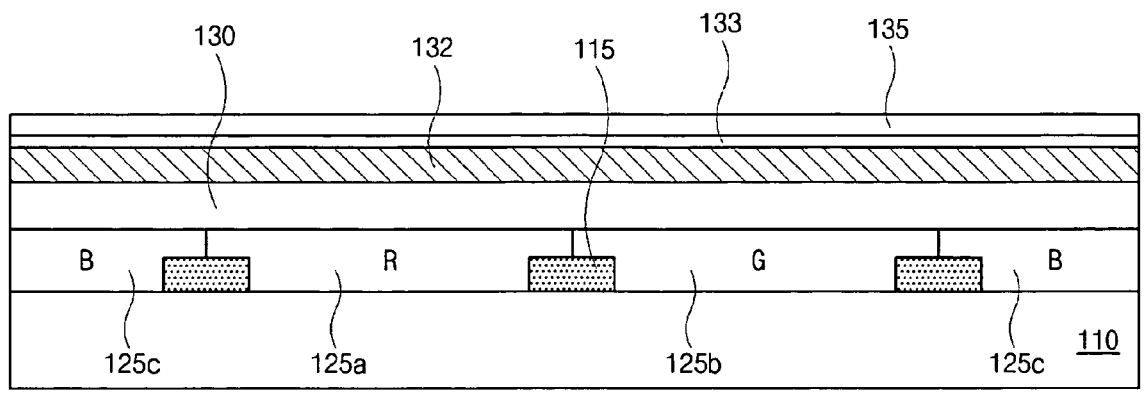

A protecting layer 133 is formed on the polarizing layer 132. The protecting layer 133 prevents moisture from penetrating into the polarizing layer 132. The protecting layer 133 may be made of barium chloride. As shown in FIG. 6F, a transparent conductive material is deposited on the protecting layer 133 to form a common electrode 135.

In the first embodiment of the present invention, the polarizing layer is disposed on the over-coat layer, which is on the color filter patterns of the color filter substrate. Accordingly, there is no need for another polarizing film to be attached on the outer surface of the color filter substrate. Therefore, polarizing efficiency and flexibility of the LCD device are increased. Further, thickness of the LCD device is reduced and deformation by heat and moisture are reduced.

The second embodiment of the present invention relates to an in-plane switching (IPS) mode liquid crystal display (LCD) device. The IPS mode LCD device includes a color filter substrate having a color filter pattern, an array substrate having a thin film transistor, and a liquid crystal interposed between the color filter substrate and the array substrate. A pixel electrode and a common electrode are disposed on the array substrate. The pixel electrode and the common electrode are parallel to and spaced apart from each other within a pixel region. Alignment of liquid crystal molecules is changed by the in-plane electric field induced between the common electrode and the pixel electrode. Therefore, the IPS mode LCD has a wide viewing-angle, about 80 degrees~85 degrees.

Figure 7:
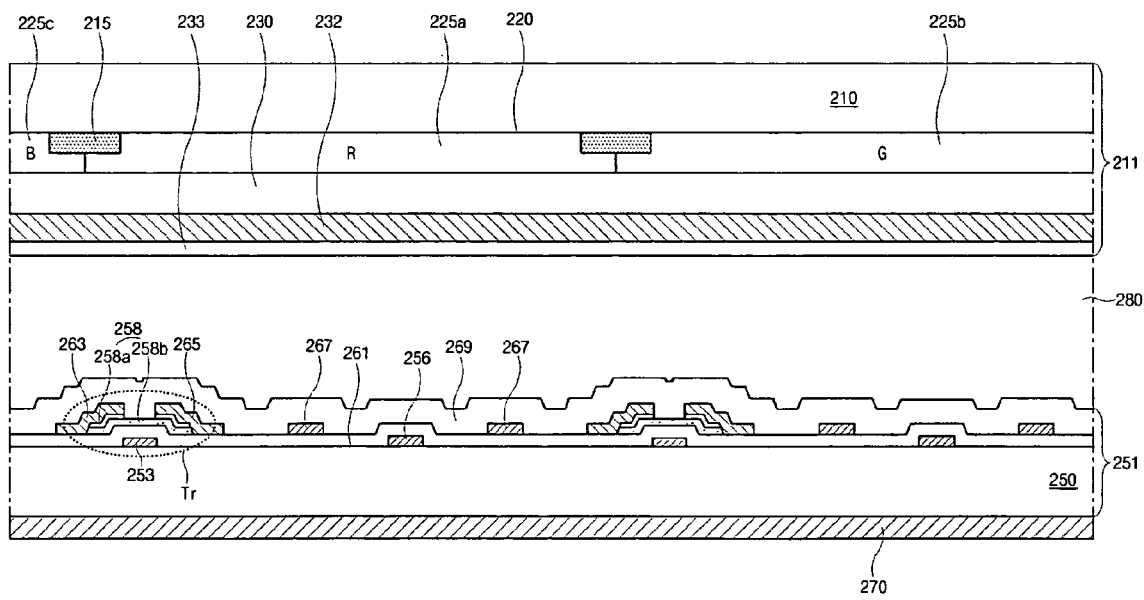
FIG. 7 is a cross-sectional view of a liquid crystal panel according to a second embodiment of the present invention.

FIG. 7 is a cross-sectional view of a liquid crystal panel according to a second embodiment of the present invention. In the second embodiment, explanations of parts similar to parts in the first embodiment will be omitted. As shown in FIG. 7, a gate electrode 253 and a common electrode 256 are disposed alternately on an inner surface of a first substrate 250. Although not shown in FIG. 7, the common line is connected with the common electrode 256 disposed on the substrate 250.

A gate insulation layer 261 is disposed on the first substrate 250 having the gate electrode 253 and the common electrode 256. The gate insulation layer 261 may be made of silicon oxide ($SiO_2$) or silicon nitride ($SiN_x$). A semiconductor pattern 258 is disposed on the gate insulation layer 261 and corresponds to the gate electrode 253. The semiconductor pattern 258 includes ohmic contact layers 258a of doped amorphous silicon and an active layer 258b of intrinsic amorphous silicon. Source and drain electrodes 263 and 265 are disposed on the semiconductor pattern 258 and are spaced apart from each other. More particularly, the source and drain electrodes 263 and 265 contact the ohmic contact layers 258a. In addition, a pixel electrode 267 is disposed on the gate insulating layer 261 and connected with the drain electrode 265. The pixel electrode 267 is parallel to and spaced apart from the common electrode 256. A passivation layer 269 is disposed over the source electrode 263, drain electrode 265 and the pixel electrode 267. The passivation layer 269 may be made of silicon oxide ($SiO_2$), silicon nitride ($SiN_x$) or a combination thereof.

A black matrix 215, a red color filter pattern 225a, a green color filter pattern 225b and a blue color filter pattern 225c, an over-coat layer 230, a polarizing layer 232, and a protecting layer 233 are disposed subsequently on an inner surface of the second substrate 210. A liquid crystal material 280 is interposed between an array substrate 251 and a color filter substrate 211. A polarizing film 270 is disposed on an outer surface of the array substrate 251.

Figure 8:
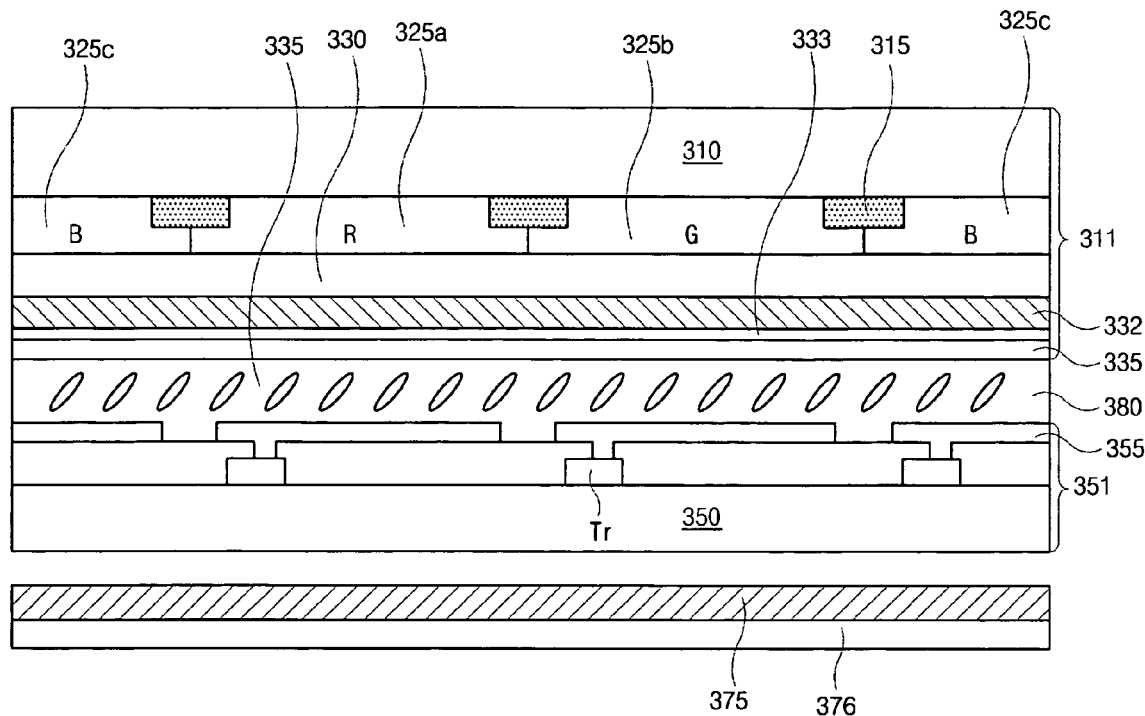
FIG. 8 is a cross-sectional view of an LCD device according to a third embodiment of the present invention.

FIG. 8 is a cross-sectional view of an LCD device according to a third embodiment of the present invention. Since the liquid crystal panel in FIG. 5 is similar to that in FIG. 8, explanations of parts similar to the parts in the first embodiment will be omitted.

As shown in FIG. 8, on an inner surface of a first substrate 350, a thin film transistor Tr and a pixel electrode 335 are disposed subsequently. A black matrix 315, red, green and blue color filter patterns 325a, 325b and 325c, an over-coated layer 330, a first polarizing layer 332, a protecting layer 333, and a common electrode 335 are disposed subsequently on an inner surface of a second substrate 310. The first polarizing layer 332 in FIG. 8 and the polarizing layer 132 in FIG. 5 are the same. A liquid crystal material 380 is interposed between an array substrate 351 and a color filter substrate 311.

A second polarizing layer 375 is disposed on an optical sheet 376 of a backlight unit. The backlight unit is disposed below an outer surface of the array substrate 351. The backlight unit further includes additional optical sheets as well as the optical sheet 376 and a lamp emitting light. The second polarizing layer 375 may be formed on the optical sheet 376 by the same method as the first polarizing layer 335. In other words, the second polarizing layer 375 can be formed on the optical sheet 376 by the slit coating method or the bar coating method, as explained in the first embodiment. In addition, the second polarizing layer 375 may be formed on the optical sheet 376 by forming the second polarizing layer 375 on a flat substrate, and transferring the second polarizing layer 375 from on the flat substrate to on the optical sheet 376. The second polarizing layer 375 has a thickness of about several micrometers.

In the first and second embodiments, a polarizing film is disposed on an outer surface of a liquid crystal panel. However, in the third embodiment, the outer polarizing film is substituted by a polarizing layer coated on an optical sheet of a backlight unit. More specifically, the backlight unit includes a lamp and at least a polarizing layer. The polarizing layer may be formed on an optical sheet along with a diffusion sheet, a prism sheet and a protection sheet. Thus, in the third embodiment, a first polarizing layer is disposed on an inner surface of the color filter substrate of the liquid crystal panel and a second polarizing layer is disposed on an optical sheet, such as a prism sheet or a protection sheet, of a backlight unit. Accordingly, thickness of the LCD device gets thinner, and deformation by heat and moisture of the LCD device is prevented.

Figure 9:
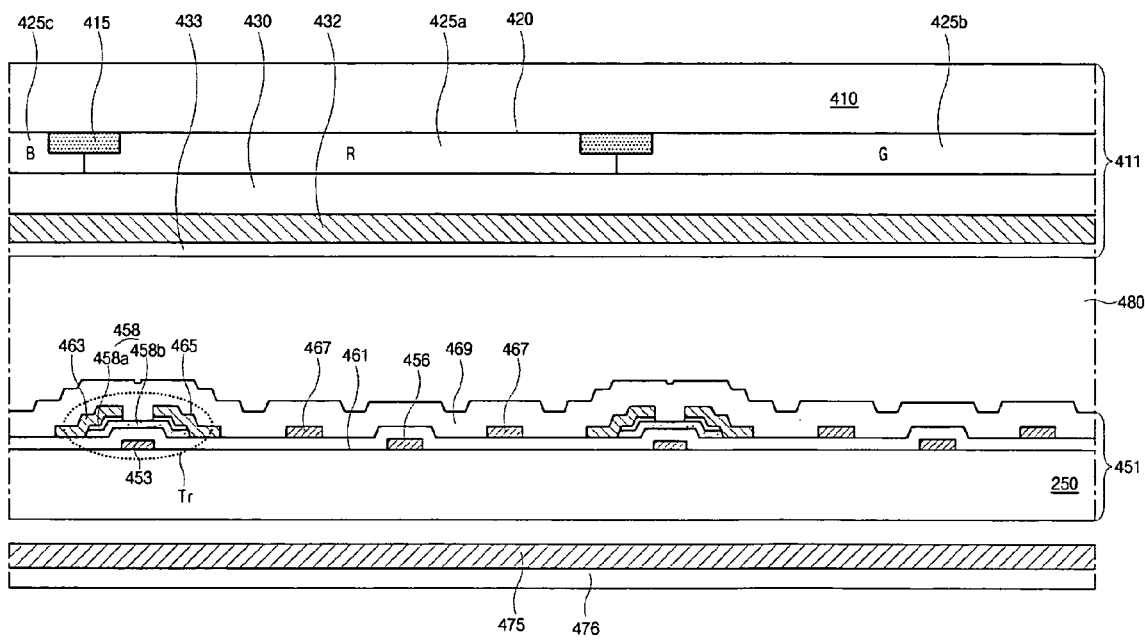
FIG. 9 is a cross-sectional view of an LCD device according to a fourth embodiment of the present invention.

FIG. 9 is a cross-sectional view of an LCD device according to a fourth embodiment of the present invention. The fourth embodiment of the present invention relates to an IPS mode LCD device similar in the second embodiment. More particularly, in a fourth embodiment, a polarizing film is substituted with a polarizing layer included with a backlight unit like in the third embodiment.

Explanations of parts in the fourth embodiment similar to parts in the second and third embodiment will be omitted. As shown in FIG. 9, a pixel electrode 467 and a common electrode 456 parallel to and spaced apart from each other are disposed on an array substrate 451. In a color filter substrate 411, a first polarizing layer 432 is disposed. A second polarizing layer 475 is disposed on an optical sheet 376 of a backlight unit.

It will be apparent to those skilled in the art that various modifications and variations can be made in the above-discussed display device and the driving method thereof without departing from the spirit or scope of the invention. Thus, it is intended that the present invention cover the modifications and variations of this invention provided they come within the scope of the appended claims and their equivalents.

What is claimed is:

1. A fabricating method of a liquid crystal display (LCD) device, comprising:
    forming gate and data lines crossing each other to define a pixel region;
    forming a thin film transistor adjacent to where the gate and data lines cross;
    forming a pixel electrode connected with the thin film transistor on the inner surface of a first substrate;
    forming a color filter pattern on the inner surface of the second substrate, wherein the inner surfaces of the first and second substrates face each other;
    forming a first polarizing layer between the first and second substrates and adjacent to the color filter pattern;
    injecting a liquid crystal material between the first and second substrates; and
    disposing a backlight unit below an outer surface of the first substrates, the backlight unit including a second polarizer thereon and the second polarizer facing the outer surface of the first substrate,
    wherein the first polarizing layer is made of a lyotropic liquid crystal, and
    wherein the step of forming the first polarizing layer comprises:
        depositing the lyotropic liquid crystal on the color filter pattern;
        drying the lyotropic liquid crystal; and
        curing the lyotropic liquid crystal.

2. The method according to claim 1, further comprising forming a common electrode on the first polarizing layer.

3. The method according to claim 2, wherein the pixel and common electrodes are made of a transparent conductive material including indium-tin-oxide (ITO) or indium-zinc-oxide (IZO).

4. The method according to claim 1, further comprising forming a common electrode on the inner surface of the first substrate, wherein the common electrode is parallel to and spaced apart from the pixel electrode in the pixel region.

5. The method according to claim 4, wherein the common electrode is formed in the same step as the gate line.

6. The method according to claim 4, wherein the pixel is formed in the same step as the data line.

7. The method according to claim 1, wherein the second polarizing layer is made of a lyotropic liquid crystal.

8. The method according to claim 1, wherein the lyotropic liquid crystal is deposited by one of a bar coating method and a slit coating method.

9. The method according to claim 1, wherein the lyotropic liquid crystal is dried at about 30 degrees Celsius~90 degrees Celsius.

10. The method according to claim 1, wherein the lyotropic liquid crystal is cured at about 150 degrees Celsius~250 degrees Celsius during about 10 minutes~60 minutes.

11. The method according to claim 1, wherein the lyotropic liquid crystal is deposited with a thickness of about 5 micrometers~20 micrometers.

12. The method according to claim 1, wherein a thickness of the first polarizing layer is about 0.3 micrometers~1.5 micrometers.

13. The method according to claim 1, further comprising forming a protecting layer on the first polarizing layer.

14. The method according to claim 7, wherein a thickness of the second polarizing layer is about several micrometers.

15. A fabricating method of a liquid crystal display (LCD) device, comprises:
    forming gate and data lines crossing each other to define a pixel region;
    forming a thin film transistor adjacent to where the gate and data lines cross;
    forming a pixel electrode connected with the film transistor on the inner surface of a first substrate;
    forming a color filter pattern on the inner surface of the second substrate, wherein the inner surface of the first and second substrate face each other;
    forming a first polarizing layer between the first and second substrate and adjacent to the color filter pattern;
    injecting a liquid crystal material between the first and second substrates; and
    depositing a backlight unit below an outer surface of the first substrate, the backlight unit including a second polarizer thereon and the second polarizer facing the outer surface of the first substrate,
    further comprising forming a common electrode on the first polarizing layer, and
    wherein the second polarizing layer is made of a lyotropic liquid crystal, and
    wherein the step of forming the second polarizing layer comprises:
        depositing the lyotropic liquid crystal on an optical sheet;
        drying the lyotropic liquid crystal; and
        curing the lyotropic liquid crystal.

16. A fabricating method of a liquid crystal display (LCD) device, comprising:
    forming gate and data lines crossing each other to define a pixel region;
    forming a thin film transistor adjacent to where the gate and data lines cross;
    forming a pixel electrode connected with the thin film transistor on the inner surface of a first substrate;
    forming a color filter pattern on the inner surface of the second substrate, wherein the inner surface of the first and second substrate faces each other;
    forming a first polarizing layer between the first and second substrate and adjacent to the color filter pattern;
    injecting a liquid crystal material between the first and second substrates; and
    depositing a backlight unit below an outer surface of the first substrate, the backlight unit including a second polarizer thereon and the second polarizer facing the outer surface of the first substrate,
    further comprising forming a common electrode on the first polarizing layer, and
    wherein the second polarizing layer is made of a lyotropic crystal, and
    wherein the step of forming the second polarizing layer comprises:
        depositing the lyotropic liquid crystal on a third substrate; and
        transferring the lyotropic liquid crystal from on the third substrate on an optical sheet.

17. A fabricating method of a liquid crystal display (LCD) device, comprising:
    forming gate and data lines crossing each other to define a pixel region;
    forming a thin film transistor adjacent to where the gate and data lines cross;
    forming a pixel electrode connected with the thin film transistor on the inner surface of a first substrate;
    forming a color filter pattern on the inner surface of the second substrate, wherein the inner surface of the first and second substrate faces each other;
    forming a first polarizing layer between the first and second substrate and adjacent to the color filter pattern;
    injecting a liquid crystal material between the first and second substrates; and
    depositing a backlight unit below an outer surface of the first substrate, the backlight unit including a second polarizer thereon and the second polarizer facing the surface of the first substrate,
    further comprising forming a common electrode on the inner surface of the first substrate, and
    wherein the common electrode is parallel to and space apart from the pixel electrode in the pixel region,
    wherein the second polarizing layer is made of a lyotropic crystal, and
    wherein the step of forming the second polarizing layer comprises:
        depositing the lyotropic liquid crystal on an optical sheet;
        drying the lyotropic liquid crystal; and
        curing the lyotropic liquid crystal.

18. A fabricating method of a liquid crystal display (LCD) device, comprising:
    forming gate and data lines crossing each other to define a pixel region;
    forming a thin film transistor adjacent to where the gate and data lines cross;
    forming a pixel electrode connected with the thin film transistor on the inner surface of a first substrate;
    forming a color filter pattern on the inner surface of the second substrate, wherein the inner surface of the first and second substrate faces each other;
    forming a first polarizing layer between the first and second substrate and adjacent to the color filter pattern;
    injecting a liquid crystal material between the first and second substrates; and
    depositing a backlight unit below an outer surface of the first substrate, the backlight unit including a second polarizer thereon and the second polarizer facing the surface of the first substrate,
    further comprising forming a common electrode on the inner surface of the first substrate, and
    wherein the common electrode is parallel to and space apart from the pixel electrode in the pixel region,
    wherein the second polarizing layer is made of a lyotropic liquid crystal, and
    wherein the step of forming the second polarizing layer comprises:
        depositing the lyotropic liquid crystal on a third substrate; and
        transferring the lyotropic liquid crystal from on the third substrate to an optical sheet.

19. The method according to claim 18, wherein a thickness of the second polarizing layer is about several micrometers.

20. The method according to claim 13, wherein the protecting layer is made of barium chloride.

* * * * *